(No Model.)
F. J. PARK.
COFFEE WARMER.
No. 591,786. Patented Oct. 12, 1897.
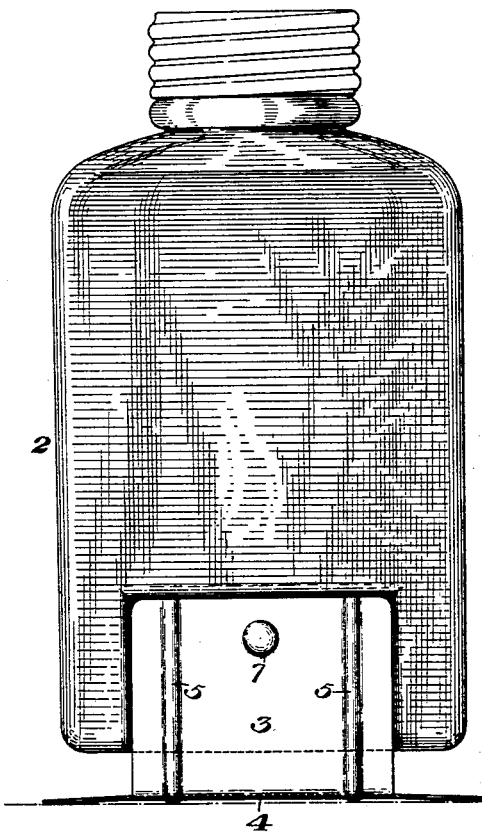
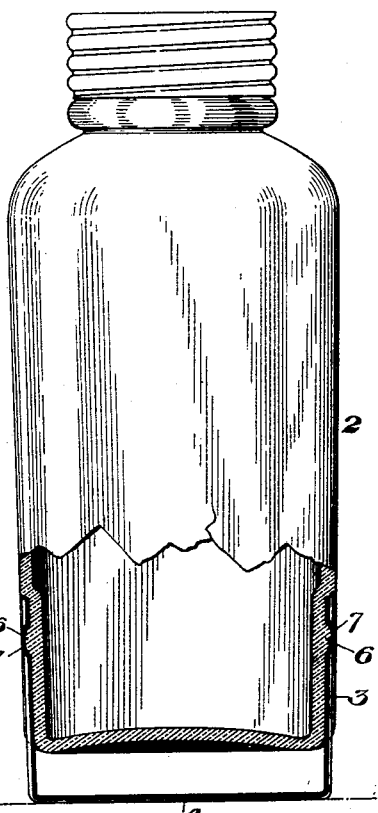
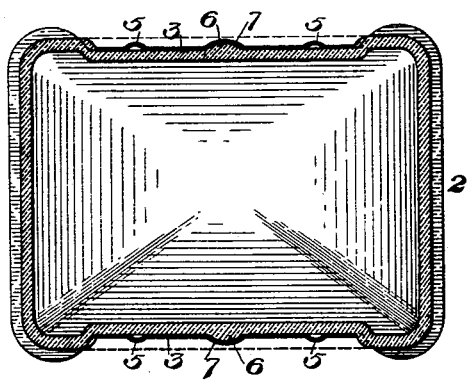
WITNESSES
Warren W. Swartz
C. E. MacKown
INVENTOR
Frederick J. Park
by Bakewell & Bakewell
his Attorneys.

UNITED STATES PATENT OFFICE.

FREDERICK J. PARK, OF WHEELING, WEST VIRGINIA, ASSIGNOR TO THE NORTH WHEELING GLASS COMPANY, OF SAME PLACE.

COFFEE-WARMER.

SPECIFICATION forming part of Letters Patent No. 591,786, dated October 12, 1897.

Application filed June 5, 1897. Serial No. 639,551. (No model.)

*To all whom it may concern:*

Be it known that I, FREDERICK J. PARK, of Wheeling, in the county of Ohio and State of West Virginia, have invented a new and useful Improvement in Coffee-Warmers, of which the following is a full, clear, and exact description, reference being had to the accompanying drawings, forming part of this specification, in which—

Figure 1 is a side elevation of my improved warmer. Fig. 2 is an end elevation, partly broken away; and Fig. 3 is a cross-section of the same.

My invention relates to the jars or bottles employed for holding coffee and similar liquid and which are provided with a holding device which will prevent cracking or breaking of the bottle or jar when the same is placed upon a stove in order to heat the liquid therein; and it consists in a newly-improved construction of the jar and the holder therefor, as hereinafter more fully described, and set forth in the claims.

In the drawings, 2 represents a glass jar or bottle of general rectangular shape, the front and rear faces of which are preferably inclined outwardly slightly toward the top. At the lower portions of these front and rear faces are provided vertical recesses extending from the bottom of the jar upwardly a short distance and arranged to receive the upwardly-projecting lips or flanges 3 3 of the holder. This holder is preferably made of sheet metal, and consists of a base 4, the end portions of which preferably extend beyond the sides of the bottle, and the flanges 3 3, which are bent up at right angles to the base and rest in the side recesses of the bottle. The holder is preferably provided with stiffening-ribs 5 5 upon the lips or flanges and with similar ribs extending across the base and upon which the holder rests, as shown in Fig. 1. To more firmly secure the bottle in the holder and to aline the same therewith, I provide small projecting bosses 6 6 within the recesses of the bottle, which fit into registering recesses in the lips of the holder, these recesses being preferably formed by striking up the metal, as shown at 7.

The advantages of my invention will be apparent to those skilled in the art, since the device is very simple and cheap, and as the recesses of the bottle extend vertically the weight of the bottle and its contents tend to retain the same securely in the holder. The recesses of the bottle being shorter than the projecting lips or flanges of the holder an airspace is left between the base of the bottle and the holder, which prevents the cracking or breaking of the bottle when placed upon a heated surface.

Without departure from my invention various changes may be made in the form and arrangement of the holder and bottle, since

I claim—

1. The combination with a bottle or jar, having oppositely-arranged recesses extending vertically from its bottom, of a holder having a flat base and upwardly-projecting flanges or lips arranged to enter said recesses.

2. The combination with a bottle or jar having in its front and rear faces recesses extending vertically from its bottom, of a holder having a flat base and vertically-extending lips or flanges of greater length than the height of the recesses.

3. The combination with a bottle or jar having vertically-extending recesses, of a holder having a flat base and upwardly-projecting flanges arranged to enter the recesses, and interfitting bosses and recesses in the bottle and holder.

In testimony whereof I have hereunto set my hand.

FREDERICK J. PARK.

Witnesses:
JOHN N. DOWD,
A. M. HAMILTON.